United States Patent
Dewimille et al.

(10) Patent No.: US 6,530,137 B1
(45) Date of Patent: Mar. 11, 2003

(54) HEAT-INSULATED PIPE AND MANUFACTURING METHOD

(75) Inventors: Bernard Dewimille, Corbeil Essone (FR); Jacques Jarrin, Nanterre (FR); Fabrice Dal Maso, Rueil Malmaison (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 0 days.

(21) Appl. No.: 09/440,284

(22) Filed: Nov. 15, 1999

(30) Foreign Application Priority Data

Nov. 16, 1998 (FR) .............................. 98 14382

(51) Int. Cl.⁷ .......................... B23P 25/00; F16L 11/00
(52) U.S. Cl. ........................ 29/527.2; 29/458; 138/119; 138/140; 138/144; 138/145; 138/149; 264/171.12
(58) Field of Search .................. 29/458, 527.2; 138/140, 144, 145, 149, 119; 264/171.12, 209.1, 209.2, 209.8

(56) References Cited

U.S. PATENT DOCUMENTS

| | | | | |
|---|---|---|---|---|
| 3,404,203 A | * | 10/1968 | Donald ........................ 264/108 |
| 3,607,505 A | * | 9/1971 | Schirmer ..................... 156/156 |
| 3,642,396 A | * | 2/1972 | Meneidis ..................... 425/109 |
| 3,877,136 A | * | 4/1975 | Groch et al. .................. 29/455 |
| 3,879,505 A | * | 4/1975 | Boutillier et al. ............. 264/48 |
| 3,957,942 A | * | 5/1976 | Meudec ....................... 264/235 |
| 3,979,818 A | * | 9/1976 | Groch et al. .............. 29/455 R |
| 4,006,920 A | * | 2/1977 | Sadler et al. .................. 285/14 |
| 4,009,975 A | * | 3/1977 | Ninomiya et al. ............. 425/66 |
| 4,115,502 A | * | 9/1978 | Rasmussen .................. 264/173 |
| 4,146,562 A | * | 3/1979 | Fukushima et al. ......... 264/45.5 |
| 4,209,476 A | * | 6/1980 | Harris ........................ 264/40.4 |
| 4,289,716 A | * | 9/1981 | Voigt ......................... 264/45.9 |
| 4,345,363 A | * | 8/1982 | Leuchs ....................... 29/527.4 |
| 4,389,366 A | * | 6/1983 | Hoesslin et al. ............. 264/558 |
| 4,397,797 A | * | 8/1983 | Nojiri et al. ................ 264/45.5 |

(List continued on next page.)

FOREIGN PATENT DOCUMENTS

| | | | | |
|---|---|---|---|---|
| EP | 400689 | 12/1990 | | |
| FR | 2169478 | 9/1973 | | |
| FR | 2350943 | 12/1977 | | |
| GB | 2081415 | * | 2/1982 | ........... F16L/59/00 |

OTHER PUBLICATIONS

Patent Abstracts of Japan, vol. 098, No. 010, 31 Aout 1998, JP 10 141587 (Fujimori Kogyo) May 29, 1998.

*Primary Examiner*—Gregory M. Vidovich
*Assistant Examiner*—Essama Omgba
(74) *Attorney, Agent, or Firm*—Antonelli, Terry, Stout & Kraus, LLP

(57) ABSTRACT

A method is intended for the thermal insulation of a flexible pipe. The method includes a first step of depositing a thickness of extrudable and rigid insulating material on an outer surface of the pipe, with the pipe moving longitudinally. The insulating material is cooled over a substantially rectilinear part downstream from the deposition area. Then, at least one circumferential slot is formed in the thickness of the rigid insulating material so as to restore flexibility of the pipe coated with the rigid insulating material. The thus-formed pipe includes a flexible inner pipe, a layer of rigid insulating material surrounding the flexible pipe, and at least one circumferential slot cut in the layer of rigid insulating material to allow flex of the heated insulated pipe.

19 Claims, 3 Drawing Sheets

U.S. PATENT DOCUMENTS

| | | | | |
|---|---|---|---|---|
| 4,484,877 A | * | 11/1984 | Stucke et al. | 425/113 |
| 4,519,863 A | * | 5/1985 | Landgraf et al. | 156/244.12 |
| 4,657,050 A | * | 4/1987 | Patterson | 138/149 |
| 4,669,172 A | * | 6/1987 | Petruzzi | 29/456 |
| 4,729,807 A | * | 3/1988 | Hede et al. | 156/172 |
| 4,878,520 A | * | 11/1989 | Nakamura et al. | 138/149 |
| 4,921,018 A | * | 5/1990 | Dridi et al. | 138/149 |
| 4,929,409 A | * | 5/1990 | Agren et al. | 264/508 |
| 5,722,462 A | * | 3/1998 | Dridi et al. | 138/149 |
| 5,927,344 A | * | 7/1999 | Nobileau | 138/114 |
| 6,012,494 A | * | 1/2000 | Balazs | 138/119 |
| 6,058,979 A | * | 5/2000 | Watkins | 138/149 |
| 6,283,160 B1 | * | 9/2001 | Hardy et al. | 138/129 |
| 6,305,429 B1 | * | 10/2001 | Welch et al. | 138/149 |
| 6,318,681 B1 | * | 11/2001 | Vitoorapakorn | 248/61 |
| 6,461,554 B2 | * | 10/2002 | Dewimille et al. | 264/162 |

* cited by examiner

HEAT-INSULATED PIPE AND MANUFACTURING METHOD

FIELD OF THE INVENTION

The present invention relates to a heat-insulated flexible pipe used for example for carrying effluents produced by oilwells, or for shipping or land carriage of liquid requiring thermal insulation.

The problem of thermal insulation of subsea petroleum production pipes arises in particular for reservoirs whose effluents, subjected to fast cooling due to the sea bottom temperature and to the thickness of the water depth, undergo physico-chemical phenomena that disturb their flow in the pipe. Hydrate formation, paraffin, asphaltene deposition or oil gelation may notably occur.

The term flexible pipes refers here to pipes consisting of polymer layers and metal reinforcing armours, and also to wound, then unwound metal tubes. In fact, the problem of thermal insulation is the same for both types of pipe: the thickness of the insulating material must not stiffen the pipe so that it can be used in the same way as a pipe without an insulant. In other words, the "flexibility" or the "rigidity" of the pipe must be substantially identical, with or without an insulant.

BACKGROUND OF THE INVENTION

Document EP-4,006,689 describes a flexible pipe thermally insulated by helical winding of strips made of expanded plastic. These relatively thin strips are wound by elastic deformation around the core of the flexible pipe. The insulating material selected should therefore allow implementation of this winding operation, which is furthermore quite extensive since several layers are necessary, while having a sufficient characteristic as regards heat insulation and mechanical strength under difficult hydrostatic pressure conditions. However, this solution is not appropriate with a high outside pressure because the wound strips do not withstand high compressive stresses.

Rigid plastic materials are well-suited for insulation and mechanical strength, but stiffening of the pipe is problematic with great thicknesses.

SUMMARY OF THE INVENTION

The present invention thus relates to a method intended for heat insulation of a flexible pipe according to the definition given here, comprising the following successive stages:

depositing, on the outer surface of the pipe moving longitudinally, a thickness of extrudable and rigid insulating material, cooling the insulating material over a substantially rectilinear part downstream from the deposition area, forming at least one circumferential slot in said thickness of the material in relation to the axis of the pipe so as to restore the flexibility of the pipe once coated with the rigid insulating material.

In a first variant, the slot can be made by machining.

In a second variant, the slot can be made as the material is deposited on the pipe.

According to the invention, the slot can be helical, with a determined width and pitch according to the allowable bending radius of the flexible pipe.

In a variant, the slot can consist of a succession of circular slots having a determined width and pitch according to the allowable bending radius of the flexible pipe. The term pitch refers here to the distance between two slots on a generatrix of the pipe.

An extruding head can be concentric to the pipe.

In a variant, an extruding head can be arranged laterally to the pipe and revolve in relation to the pipe so as to deposit said material in the form of a helical strip.

Extrusion can be performed in several successive layers so as to reach great insulant thicknesses.

A layer of sticking preventive material, for example an antiadhesive strip coating, or grease or equivalent, can be deposited on the outside of each layer of extruded material.

In the case where the operation is carried out with several layers, each layer can comprise machined slots.

The invention also relates to a heat-insulated flexible pipe comprising at least one layer of rigid and extruded insulating material on the outside of said pipe. The layer comprises means for restoring the flexibility of the insulated pipe in the form of at least one circumferential slot.

In the pipe, the width and the pitch of the slots can be calculated according to the allowable bending radius of the pipe.

In the pipe, the slot can be filled with a material that can flow, such as a gel or grease.

BRIEF DESCRIPTION OF THE DRAWINGS

Other features and advantages of the present invention will be clear from reading the description hereafter of non limitative examples, illustrated by the accompanying drawings wherein.

DETAILED DESCRIPTION

Figure 1A:
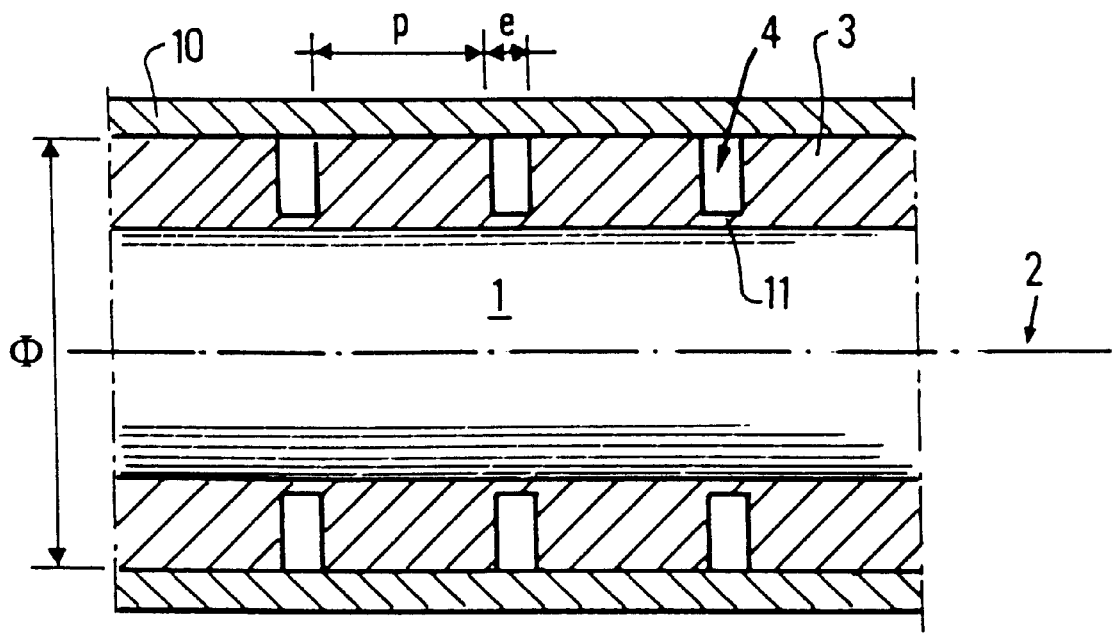
FIGS. 1a and 1b show the principle of the invention.
Figure 1B:
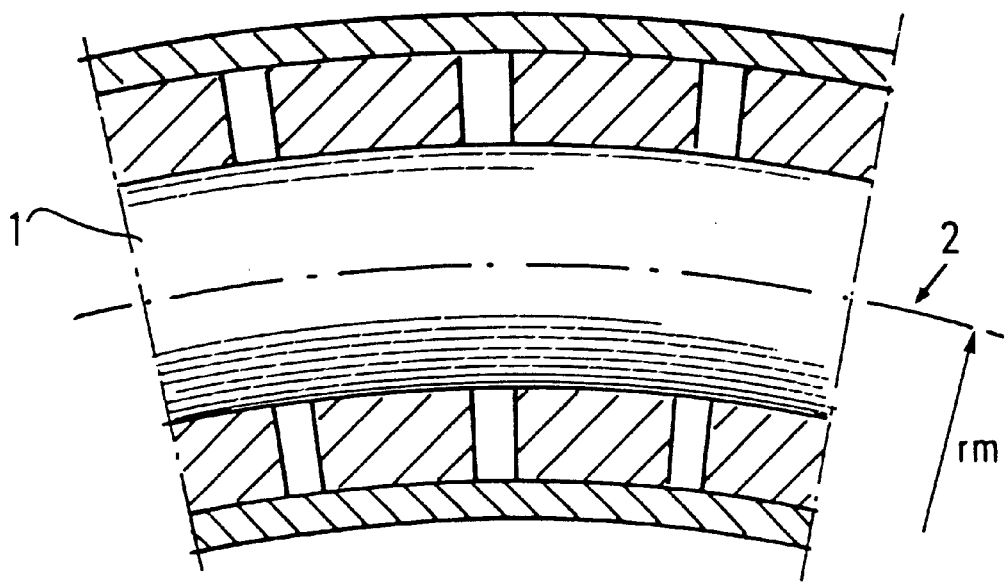

FIG. 1a and 1b show, in lengthwise section, a flexible pipe 1 of allowable winding radius rm and of longitudinal axis 2. The diameter of the pipe is denoted by Φ. The elongation ratio proportion of the outer fiber can be calculated as follows:

A=Φ/2 rm (%), assuming that the flexurally neutral fiber is situated on the longitudinal axis 2 of the pipe.

According to the pitch p between two successive slots 4 cut in the layer 3 of insulating material, the width of the slots and the pitch p can be estimated by taking into account an elongation proportion value generally allowed for high-pressure pipes, generally between 5 and 8%.

For example, for a 7% elongation and a 3-mm slot, the pitch p between the slots should be about (3/7)×100=43 mm.

This means that, in this case, circumferential slots 4 should be spaced out by about 50 mm or, if the hollow consists of a helical slot, the spiral pitch should be about 50 mm. FIG. 1b diagrammatically shows the role of the slots in restoring the flexibility of the pipe despite the rigidity of the insulating material.

FIGS. 2a to 2e diagrammatically show manufacturing means according to the invention.

In the present invention, the term circumferential slot designates circular (annular) slots, continuous or discontinuous (i.e. the slot is cut only in a portion of the circumference), slots arranged according to a continuous or discontinuous helix.

Reference number 1 designates the flexible pipe to be insulated by means of the layer(s) 3 of insulating material extruded by an extrusion die 5 supplied with fluidized material by extruder 6. The layer of insulating material is hardened by fast cooling in cooling means 7. A cutting system 8 revolves around the pipe to machine the slots. The system consists of one or more saw blades driven by a motor. The cutting system revolves around the pipe to cut the slots over part or all of the periphery of the pipe. The system can be controlled according to the forward motion of the pipe so as to make one or more continuous or partial helical slots, or it can be stationary in relation to the pipe during the machining procedure in the case of a continuous or discontinuous circular slot. In the latter variant, means for controlling the displacement sequence are required to reposition the saw in order to cut a new slot at a distance equal to the desired pitch, considering the longitudinal displacement of the flexible pipe as a whole. The depth of the slot is adjusted so as to be at most less than or equal to the thickness of the extruded insulant layer. In practice, adjustment allows a small thickness of insulant II (FIG. 1*a*) to remain, which does not hinder the flexibility of the insulated pipe but facilitates adjustment of the machining depth.

Figure 2A:
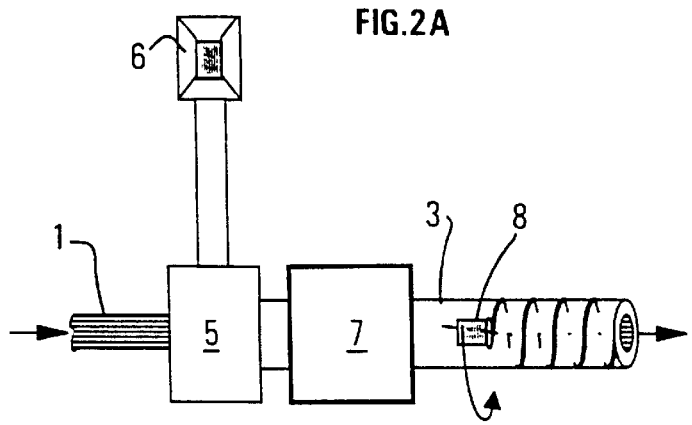
FIGS. 2a to 2e show different manufacturing method variants for the pipe according to the invention.
Figure 2B:
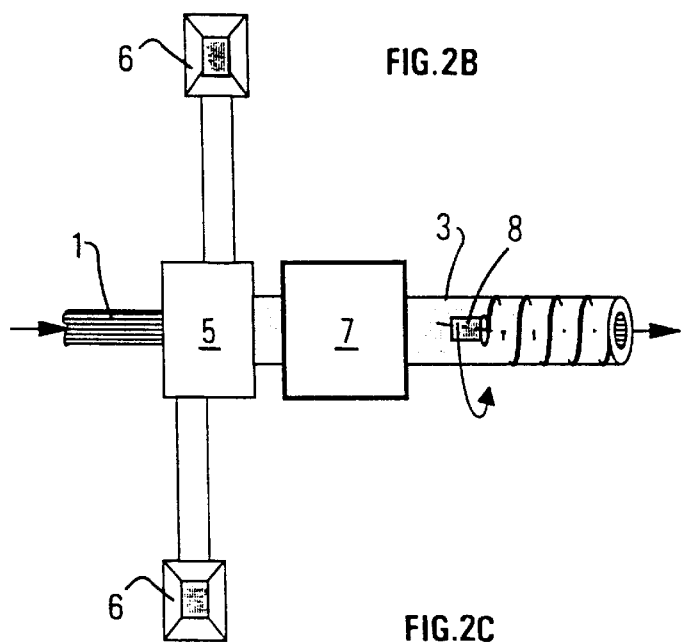

FIG. 2*b* shows a variant with two extruders and a single die. Considering the great thickness generally desired for the insulant, a second extruder can be necessary for feeding the die.

Figure 2C:
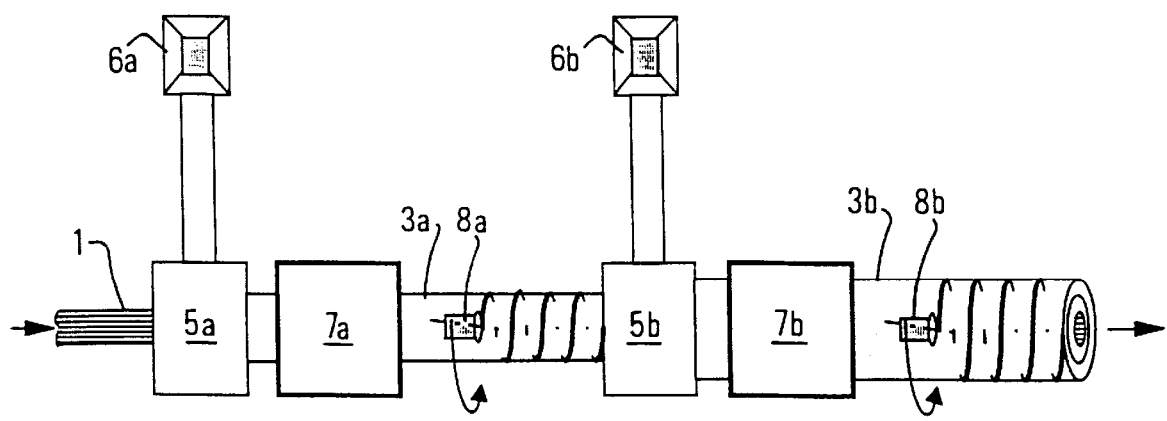

FIG. 2*c* illustrates another variant where extrusion of the insulating material is performed in several stages so as to have several successive layers allowing to obtain a relatively great final thickness. The first layer 3*a* can be cut by means of a first machining system 8*a*. The successive layers can also have their own machining system (8*b* for layer 3*b*). In this variant, a layer of tape is preferably placed on layer 3*a* so as to prevent the extrusion performed by die 5*b* from filling the slots machined in layer 3*a*. Using two separate extruders allows these layers of different materials to be deposited.

Figure 2D:
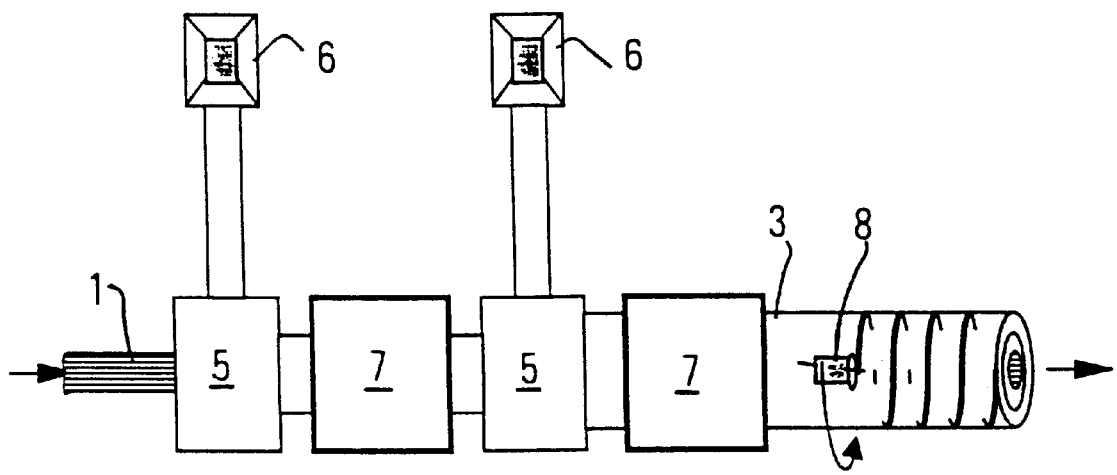

FIG. 2*d* shows a manufacturing variant having the same advantages as variant 2*c*, but the manufacturing device comprises a single slot machining system.

Figure 2E:
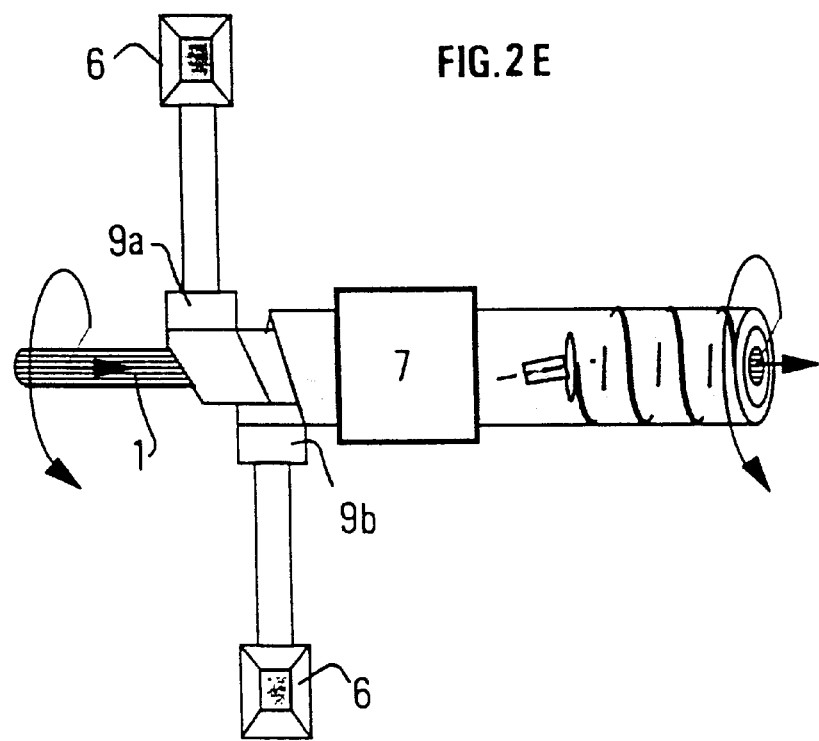

FIG. 2*e* illustrates a very particular use of the manufacturing method where there is no co-axial die as before, but radial extrusion openings 9*a*, 9*b* whose function is to deposit the insulating material in the form of helically wound strips on the flexible pipe.

Of course, in this case, either pipe 1 is driven in rotation around its longitudinal axis, or the extrusion system revolves around the pipe. The latter solution is difficult to implement, except if the device comprising the extrusion openings revolves around the pipe, the extruder itself remaining stationary and supplying the rotating die by means of a rotary joint. In the case of a rotating die that deposits a strip laterally, the helical slots can be formed directly by means of a specific forming device.

It is clear that all the materials that can be extruded and quickly cooled to be machined according to the present method are suited. Rigid materials having a good mechanical strength in order to withstand collapse or the outside pressure stresses that the flexible pipe may undergo, for example the hydrostatic pressure at the sea bottom, are preferably used here. These materials preferably have moduli above several hundred Mega Pascals. The flexible pipe most often comprises an extruded external sealed sheath 10 (FIG. 1*a*).

The rigid material preferably has a low heat conductivity. Solid or lightened materials can be used. Non-lightened thermoplastic polymers can be used, for example to polyethylene, polypropylene, polyamide, PVC, . . . . The temperature to be withstood is taken into account when selecting the material. Plastic materials can be reinforced by fillers or short fibers compatible with extrusion, which limits creep. Lightened but rigid materials can be used to withstand the pressure, for example syntactic materials lightened by hollow microspheres.

The slots can be filled with a deformable material or a material that can move by flowing, for example grease, a gel, . . . . The interest of this filling material is that it allows to place in the slots a more or less incompressible fluid that can however move in the compressed zone towards the wider zone (FIG. 1*b*), its presence preventing creep of the insulating material and/or of the outer sheath that may tend to fill in the slots.

What is claimed is:

1. A method intended for thermal insulation of a flexible pipe having a longitudinal axis, comprising the following successive stages:

extruding, on an outer surface of said pipe moving longitudinally, a thickness of extrudable insulating material, hardening said insulating material by cooling said insulating material over a substantially rectilinear part downstream from the deposition area to form a rigid insulating material, forming at least one circumferential slot in said thickness of the rigid insulating material in relation to the longitudinal axis of the pipe, the at least one circumferential slot comprising one of at least one helical slot having a width and pitch sufficient to restore flexibility of the pipe once coated with said rigid material and a plurality of annular slots spaced so as to restore flexibility of said pipe once coated with said rigid insulating material.

2. The method as claimed in claim 1, wherein said at least one circumferential slot is formed by machining.

3. The method as claimed in claim 1, wherein said at least one circumferential slot is helical.

4. The method as claimed in claim 1, wherein said at least one circumferential slot comprises a plurality of circular slots.

5. A method intended for thermal insulation of a flexible pipe having a longitudinal axis, comprising the following successive stages:

extruding, on an outer surface of said pipe moving longitudinally, a thickness of extrudable insulating material, with an extruding head concentric to said pipe, hardening said insulating material by cooling said insulating material over a substantially rectilinear part downstream from the deposition area to form a rigid insulating material, forming at least one circumferential slot in said thickness of the rigid insulating material in relation to the longitudinal axis of the pipe, the at least one circumferential slot comprising one of at least one helical slot having a width and pitch sufficient to restore flexibility of the pipe once coated with said rigid material and a plurality of annular slots spaced so as to restore flexibility of said pipe once coated with said rigid insulating material.

6. A method intended for thermal insulation of a flexible pipe having a longitudinal axis, comprising the following successive stages:

extruding, on an outer surface of said pipe moving longitudinally, a thickness of extrudable insulating material, with an extruding head arranged laterally to said pipe and revolving in relation to the pipe so as to deposit said material in the form of a helical strip, hardening said insulating material by cooling said insulating material over a substantially rectilinear part downstream from the deposition area to form a rigid insulating material, forming at least one circumferential slot in said thickness of the rigid insulating material in relation to the longitudinal axis of the pipe, the at least one circumferential slot comprising one of at least one helical slot having a width and pitch sufficient to restore flexibility of the pipe once coated with said rigid material and a plurality of annular slots spaced so as to restore flexibility of said pipe once coated with said rigid insulating material.

7. A method intended for thermal insulation of a flexible pipe having a longitudinal axis, comprising the following successive stages:

extruding, on an outer surface of said pipe moving longitudinally, a thickness of extrudable insulating material, by extrusion performed in several successive layers so as to reach great thicknesses of insulating material, hardening said insulating material by cooling said insulating material over a substantially rectilinear part downstream from the deposition area to form a rigid insulating material, forming at least one circumferential slot in said thickness of the rigid insulating material in relation to the longitudinal axis of the pipe, the at least one circumferential slot comprising one of at least one helical slot having a width and pitch sufficient to restore flexibility of the pipe once coated with said rigid material and a plurality of annular slots spaced so as to restore flexibility of said pipe once coated with said rigid insulating material.

8. The method as claimed in claim 7, wherein a layer of sticking preventive material is deposited on the outside of each extruded layer of material.

9. The A method as claimed in claim 7, wherein each layer comprises said machined slots.

10. A heat insulated flexible pipe, characterized in that it comprises at least one layer of rigid and insulating material on the outside of said pipe, and in that said layer comprises means for restoring the flexibility of the insulated pipe in the form of a at least one circumferential slot on said pipe, the at least one circumferential slot comprising one of at least one helical slot having a width and pitch sufficient to restore flexibility of the pipe having said at least one layer of rigid insulating material and a plurality of annular slots spaced so as to restore flexibility of said pipe having said at least one layer of rigid insulating material.

11. The pipe as claimed in claim 10, wherein said slot is filled with a material than can flow.

12. A heat insulated pipe, comprising; a flexible pipe;

a layer of rigid insulating material extruded on the flexible pipe; and at least one circumferential slot cut in the layer of rigid insulating material to allow flex of the heat insulated pipe, the at least one circumferential slot comprising one of at least one helical slot having a width and pitch sufficient to restore flexibility of the pipe having said layer of rigid material and a plurality of annular slots spaced so as to restore flexibility of said pipe having said layer of rigid insulating material.

13. The pipe as claimed in claim 12, wherein the at least one circumferential slot comprises a plurality of annular slots.

14. The pipe as claimed in claim 13, wherein the plurality of annular slots are continuous.

15. The pipe as claimed in claim 13, wherein the plurality of annular slots are discontinuous.

16. The pipe as claimed in claim 12, wherein the at least one circumferential slot comprises at least one helical slot.

17. The pipe as claimed in claim 16, wherein the at least one helical slot is continuous.

18. The pipe as claimed in claim 16, wherein the at least one helical slot is discontinuous.

19. The pipe as claimed in claim 12, further comprising a deformable material provided in the at least one circumferential slot.

* * * * *